United States Patent
Yoshihara et al.

(10) Patent No.: US 7,653,477 B2
(45) Date of Patent: Jan. 26, 2010

(54) METHOD AND DEVICE FOR CONTROL IGNITION TIMING THROUGH KNOCK CONTROL IN AN INTERNAL COMBUSTION ENGINE

(75) Inventors: Masatomo Yoshihara, Toyota (JP); Kenji Kasashima, Nishikamo-gun (JP); Rihito Kaneko, Nishikamo-gun (JP); Koji Aso, Susono (JP); Kenji Senda, Okazaki (JP); Yuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 0 days.

(21) Appl. No.: 12/162,202

(22) PCT Filed: Jan. 24, 2007

(86) PCT No.: PCT/JP2007/051540
§ 371 (c)(1),
(2), (4) Date: Jul. 25, 2008

(87) PCT Pub. No.: WO2007/086595
PCT Pub. Date: Aug. 2, 2007

(65) Prior Publication Data
US 2009/0043484 A1    Feb. 12, 2009

(30) Foreign Application Priority Data
Jan. 27, 2006    (JP)    ............... 2006-019634

(51) Int. Cl.
*G06F 19/00* (2006.01)
*F02P 5/152* (2006.01)
(52) U.S. Cl. ............ 701/111; 123/406.34; 123/406.38

(58) Field of Classification Search ............... 701/111, 701/114, 115, 102, 101; 123/406.21, 406.29, 123/406.33–406.38
See application file for complete search history.

(56) References Cited

U.S. PATENT DOCUMENTS

| | | | | |
|---|---|---|---|---|
| 4,711,212 | A | * | 12/1987 | Haraguchi et al. ...... 123/406.38 |
| 5,267,164 | A | * | 11/1993 | Miyama ................. 701/111 |
| 7,281,516 | B2 | | 10/2007 | Kaneko et al. |
| 7,363,142 | B2 | * | 4/2008 | Kaneko et al. ............ 701/111 |
| 7,392,788 | B2 | * | 7/2008 | Kaneko et al. ......... 123/406.29 |
| 2004/0226539 | A1 | | 11/2004 | Takahashi et al. |
| 2006/0107926 | A1 | | 5/2006 | Endou |

FOREIGN PATENT DOCUMENTS

EP    1 519 019    3/2005

(Continued)

*Primary Examiner*—Hieu T Vo
(74) *Attorney, Agent, or Firm*—Oblon, Spivak, McClelland, Maier & Neustadt, L.L.P.

(57) ABSTRACT

An engine ECU executes a program including: determining whether or not a condition for stopping knocking determination is satisfied; setting a flag of stopping correction of a determination value to "ON"; calculating a knock determination level based on the extracted magnitude value; and when the correction stop flag is not "ON", decreasing or increasing the determination value in accordance with a knock proportion KC that is a proportion of magnitude values greater than the knock determination level. The knock determination level is calculated even when the correction stop flag is "ON".

18 Claims, 15 Drawing Sheets

FOREIGN PATENT DOCUMENTS

| | | |
|---|---|---|
| EP | 1 531 324 | 5/2005 |
| JP | 4 76249 | 3/1992 |
| JP | 2003 21032 | 1/2003 |
| JP | 2004 353531 | 12/2004 |
| JP | 2005 23902 | 1/2005 |

* cited by examiner

FIG. 7

| A | C | B |
|---|---|---|
| B | C | B |
| A | B | A |

ENGINE SPEED NE (vertical axis label)

INTAKE AIR AMOUNT KL (horizontal axis label)

METHOD AND DEVICE FOR CONTROL IGNITION TIMING THROUGH KNOCK CONTROL IN AN INTERNAL COMBUSTION ENGINE

TECHNICAL FIELD

The present invention relates to device and method for controlling ignition timing of an internal combustion engine, and particularly to a technique of controlling ignition timing based on whether knocking is present or absent.

BACKGROUND ART

Conventionally, various methods of determining whether knocking (knock) is present or absent have been proposed. A knock control device for an internal combustion engine disclosed in Japanese Patent Laying-Open No. 2003-021032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor; and a final determination portion finally determining occurrence of knocking based on the knock temporal determination of the first temporal determination portion and the knock temporal determination of the second temporal determination portion. When both of the first and second temporal determination portions determine that knocking has occurred, the final determination portion finally determines that knocking has occurred.

According to the knock control device disclosed by the publication, a knock temporal determination by a statistical processing program and a knock temporal determination by a waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

However, in the knock control device of Japanese Patent Laying-Open No. 2003-021032, a knocking determination by statistical processing and a knock determination by waveform shape are independently performed. Accordingly, the precision of each of the determination method itself is not improved, and the problem of deterioration in the precision due to noise components is not solved in each of the determination method. Therefore, in order to precisely determine whether knocking is present or absent to thereby appropriately perform retard control or the like at the time of knocking, further improvements have still been required.

DISCLOSURE OF THE INVENTION

An object of the present invention is to provide a device and the like for controlling ignition timing of an internal combustion engine that can appropriately control ignition timing.

A device for controlling ignition timing of an internal combustion engine according to the present invention includes a knock sensor detecting a magnitude value related to magnitude of vibration occurring in the internal combustion engine and an operation unit connected to the knock sensor. The operation unit calculates knock magnitude related to magnitude of vibration due to knocking, based on the magnitude of vibration occurring in the internal combustion engine. The operation unit controls ignition timing of the internal combustion engine, based on a result of comparison between the knock magnitude and a predetermined determination value. The operation unit performs an operation used for determining a knocking occurrence state, based on the magnitude value. The operation unit determines the knocking occurrence state, based on a result of the operation. The operation unit corrects the determination value, based on the knocking occurrence state. When a predetermined condition is satisfied, the operation unit stops correction of the determination value. The operation unit continuously performs the operation, in a state where correction of the determination value is stopped.

According to the present invention, knock magnitude related to magnitude of vibration due to knocking is calculated, based on the magnitude of vibration occurring in the internal combustion engine. Ignition timing of the internal combustion engine is controlled, based on a result of comparison between the knock magnitude and a predetermined determination value. Meanwhile, magnitude of the same vibration occurring in the internal combustion engine may be detected as different values for example due to variation in the output values and degradation of the knock sensor, and thus knock magnitude may be calculated differently. In this case, ignition timing, which has appropriately been controlled in the initial state of the internal combustion engine, may become inappropriate. Therefore, for example when it can be regarded that the occurrence frequency of knocking is high, it is necessary to correct the determination value in accordance with the state of vibration occurring in the internal combustion engine, so that retard control of ignition timing is performed frequently. Accordingly, a magnitude value related to magnitude of vibration occurring in the internal combustion engine is detected. An operation used for determining a knocking occurrence state is performed, based on the detected magnitude value (for example, an operation of calculating a knock determination level based on the magnitude value is performed). The knocking occurrence state is determined, based on a result of the operation. The determination value to be compared with the knock magnitude is corrected, based on a result of the determination of the knocking occurrence state (for example, a knocking occurrence frequency). Thus, when it is regarded that the knocking occurrence frequency is high from the state of vibrations in the past ignition cycles, the determination value is corrected so that ignition timing when knocking has occurred is retarded more frequently. Thus, a determination that knocking has occurred is prone to be made in a knocking determination for each ignition cycle. Conversely, when it is regarded that the knocking occurrence frequency is low from the state of vibrations in the past ignition cycles, the determination value is corrected so that ignition timing when knocking has not occurred is advanced more frequently. Thus, a determination that knocking has occurred is not easily be made in a knocking determination for each ignition cycle. Accordingly, it becomes possible to set the determination value in the knocking determination for each ignition cycle to an appropriate value, to thereby attain appropriate ignition timing. Meanwhile, for example when the state of the internal combustion engine is an idling state, knocking hardly occurs. Therefore, it is not necessary to determine whether knocking is present or absent to control ignition timing. Accordingly, when the state of the internal combustion engine satisfies a predetermined condition (for example, an idling state), together with knocking determination, correction of the determination value is also stopped. Here, when an operation used for determining the knocking occurrence state (for example, calculation of knock determination level) is stopped in a state where correction of the determination value is stopped, the knocking occurrence state is determined based on the operation result immediately before correction is stopped in resuming the correction of the determination value. Based on this determination result, correction of the determination value is performed. The operation result immediately before correction is stopped does not reflect the effect of the change in the operation state of the internal combustion engine in the period where correction of the determination value has been stopped. Accordingly, the operation result immediately before correction is stopped may not be appropriate after the correction is resumed. Accordingly, in a state where correction of the determination value is stopped, the operation used for determining the knocking occurrence state is continuously performed. Thus, it becomes possible to determine the knocking occurrence state using the appropriate operation result from the time point immediately after correction of the determination value is resumed, and to correct the determination value to be compared with the knock magnitude. As a result, a device for controlling ignition timing of an internal combustion engine that can set the determination value in a knocking determination for each ignition cycle to an appropriate value to thereby control ignition timing appropriately can be provided.

Preferably, the operation is an operation of calculating a knock determination level, based on the magnitude value. The operation unit determines the knocking occurrence state, based on a result of comparison between the magnitude value and the knock determination level.

According to the present invention, a knock determination level is calculated based on the detected magnitude value. This allows to obtain a knock determination level reflecting magnitude values in the past ignition cycles. Accordingly, a knock determination level in which the effect of the operation state or individual difference of the internal combustion engine on the magnitude value is considered can be obtained. The knocking occurrence state is determined based on a result of comparison between this knock determination level and the magnitude value. For example, among the detected magnitude values, the frequency of detecting magnitude values greater than the knock determination level is employed as the knocking occurrence frequency. The determination value is corrected based on the knocking occurrence frequency. This allows to precisely determine the knocking occurrence state in accordance with the operation state or individual difference of the internal combustion engine. As a result, the determination value can be set to an appropriate value and ignition timing can appropriately be controlled.

Further preferably, the knock determination level is calculated by adding a product of a standard deviation of the magnitude values and a predetermined coefficient to a median value of the magnitude values.

According to the present invention, the knock determination level is calculated by adding a product of a standard deviation of the magnitude values and a predetermined coefficient to a median value of the magnitude values. This allows to obtain a knock determination level reflecting magnitude values in the past ignition cycles. Accordingly, a knock determination level in which the effect of the operation state or individual difference of the internal combustion engine on the magnitude value is considered can be obtained. The knocking occurrence state is determined based on a result of comparison between this knock determination level and the extracted magnitude value. As a result, the knocking occurrence state can precisely be determined in accordance with the operation state or individual difference of the internal combustion engine.

Further preferably, the predetermined condition is at least one of a condition that the internal combustion engine is in a predetermined operation state, a condition that a voltage of power supply of the device for controlling ignition timing is lower than a predetermined voltage, and a condition that the knock sensor is in an abnormal state.

According to the present invention, for example in an operation state where the internal combustion engine is low-loaded, knocking is less likely to occur. In an operation state where the internal combustion engine is high-loaded, in some cases when the determination value is corrected and ignition timing is retarded, the output of the internal combustion engine falls and fails to attain a required output. When the temperature of the internal combustion engine is low, knocking is less likely to occur. Further, when the voltage of power supply of the ignition timing control device is lower than a predetermined voltage, stable knocking determination or correction of the determination value may not be attained. Further, when the knock sensor is in an abnormal state (for example, when it is damaged), it may not be possible to correct the determination value to an appropriate value. Accordingly, when at least one of the condition that the internal combustion engine is in a predetermined operation state, the condition that a voltage of power supply of the device for controlling ignition timing is lower than a predetermined voltage, and the condition that the knock sensor is in an abnormal state is satisfied, together with knocking determination, correction of the determination value is stopped. In such a case, an operation used for determining the knocking occurrence state is continuously performed. Thus, it becomes possible to determine the knocking occurrence state using the appropriate operation result from the time point immediately after correction of the determination value is resumed, and to correct the determination value to be compared with the knock magnitude. As a result, the determination value in a knocking determination for each ignition cycle can be set to an appropriate value from the time point immediately after correction of the determination value is resumed, to control ignition timing appropriately.

Further preferably, the predetermined operation state is at least one of an idling state and a state where a temperature of cooling water of the internal combustion engine is lower than a predetermined temperature.

According to the present invention, in an idling state or in a state where the temperature of the cooling water of the internal combustion engine is lower than a predetermined temperature, in which state it is not necessary to determine whether knocking is present or absent since knocking is less likely to occur, correction of the determination value together with the knocking determination is stopped. In this state, an operation used for determining the knocking occurrence state is continuously performed. Thus, it becomes possible to determine the knocking occurrence state using the appropriate operation result from the time point immediately after correction of the determination value is resumed because the engine is no more in the idling state or the temperature of the cooling water of the engine becomes higher than the predetermined temperature. Accordingly, the determination value to be compared with the knock magnitude can be corrected. As a result, the determination value in a knocking determination for each ignition cycle can be set to an appropriate value immediately after the idling state ends or the temperature of the cooling water of the engine becomes higher than the predetermined temperature, to control ignition timing appropriately.

Further preferably, the operation unit determines a knocking occurrence frequency. The operation unit corrects the determination value, based on the knocking occurrence frequency.

According to the present invention, the determination value used for determining whether knocking has occurred or not for each ignition cycle is corrected, based on the frequency of determining that knocking has occurred in the internal combustion engine using the knock magnitude. Thus, when it is regarded that the knocking occurrence frequency is high, in order to retard ignition timing when knocking has occurred more frequently, the determination value is corrected so that a determination that knocking has occurred is prone to be made in a knocking determination for each ignition cycle. Conversely, when it is regarded that the knocking occurrence frequency is low, in order to advance ignition timing when knocking has not occurred more frequently, the determination value is corrected so that a determination that knocking has occurred is not easily be made in a knocking determination for each ignition cycle. Accordingly, it becomes possible to set the determination value in the knocking determination for each ignition cycle to an appropriate value, to thereby attain appropriate ignition timing.

BRIEF DESCRIPTION OF THE DRAWINGS

FIG. 7 is a chart showing a map of a determination value V(KX) stored in the memory of the engine ECU;

BEST MODES FOR CARRYING OUT THE INVENTION

Figure 1:
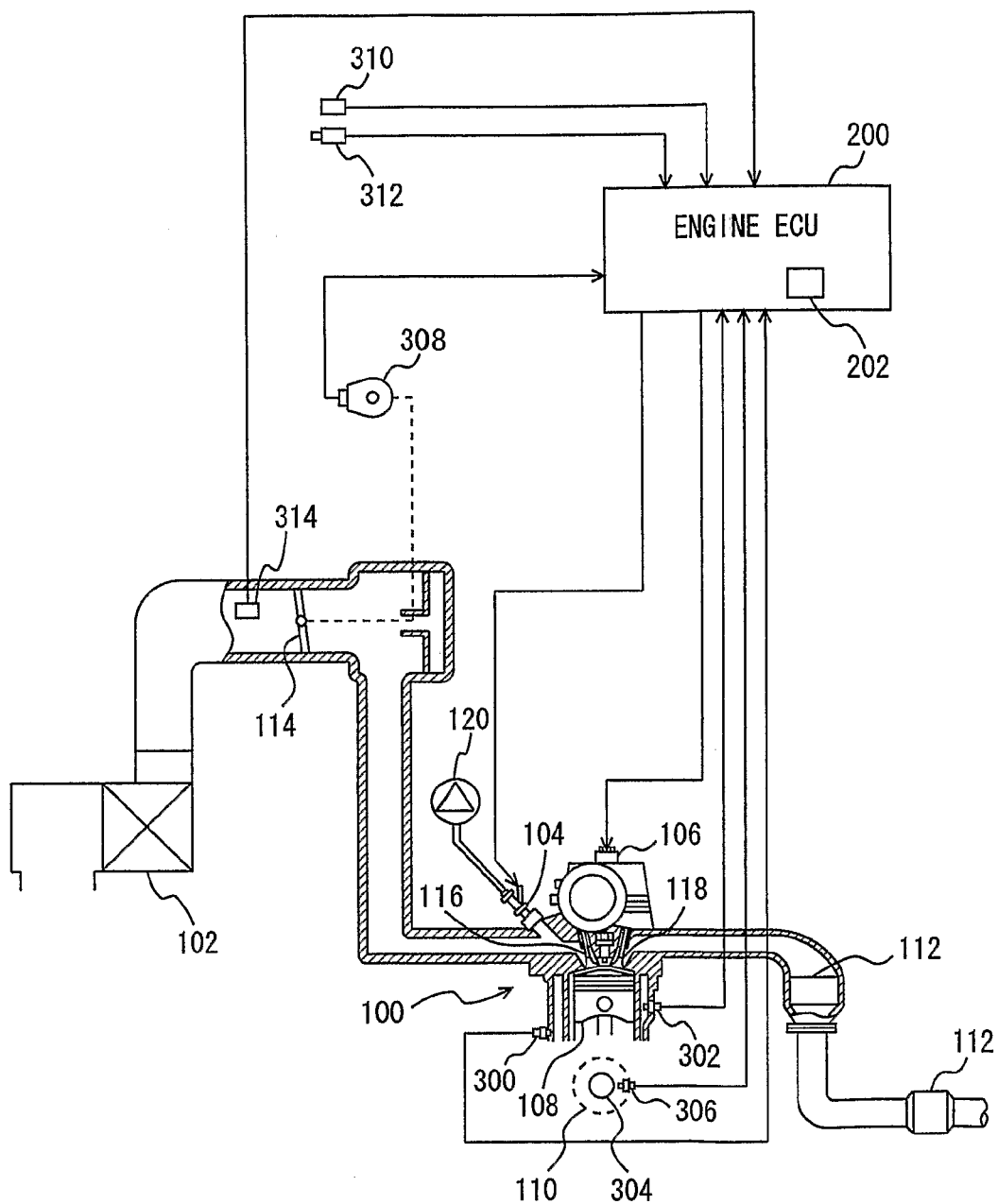
FIG. 1 is a schematic configuration diagram of an engine controlled by an engine ECU which is an ignition timing control device according to an embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control device according to the embodiment of the present invention will be described. The ignition timing control device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel, Ignition switch 312 is turned on by a driver in starting of engine 100. Air flow meter 314 detects the intake air amount into engine 100 and sends a signal representing a detection result to engine ECU 200.

Engine ECU 200 performs computation based on signals sent from the respective sensors and ignition switch 312 and map and program stored in memory 202 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
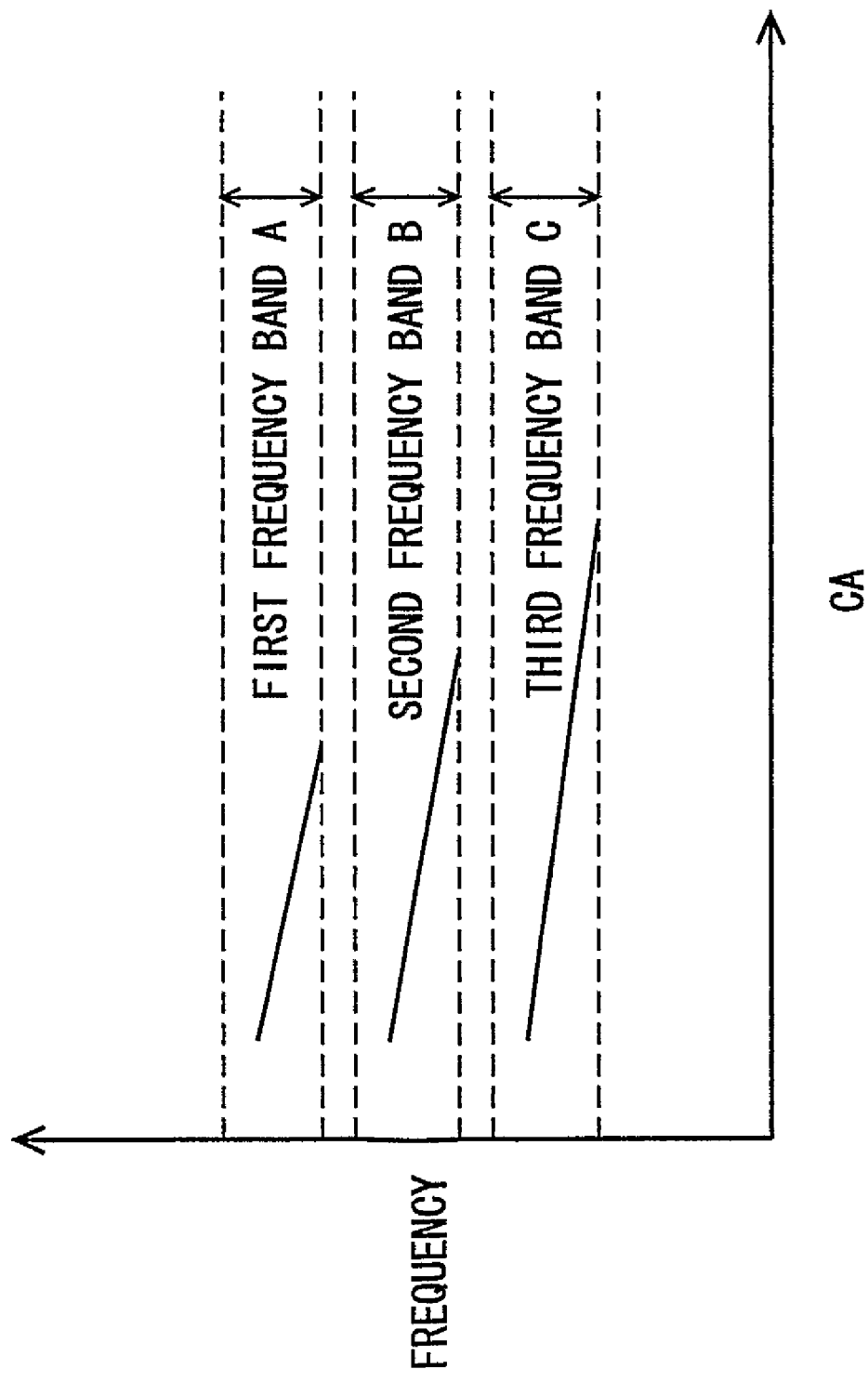
FIG. 2 is a chart showing frequency bands of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
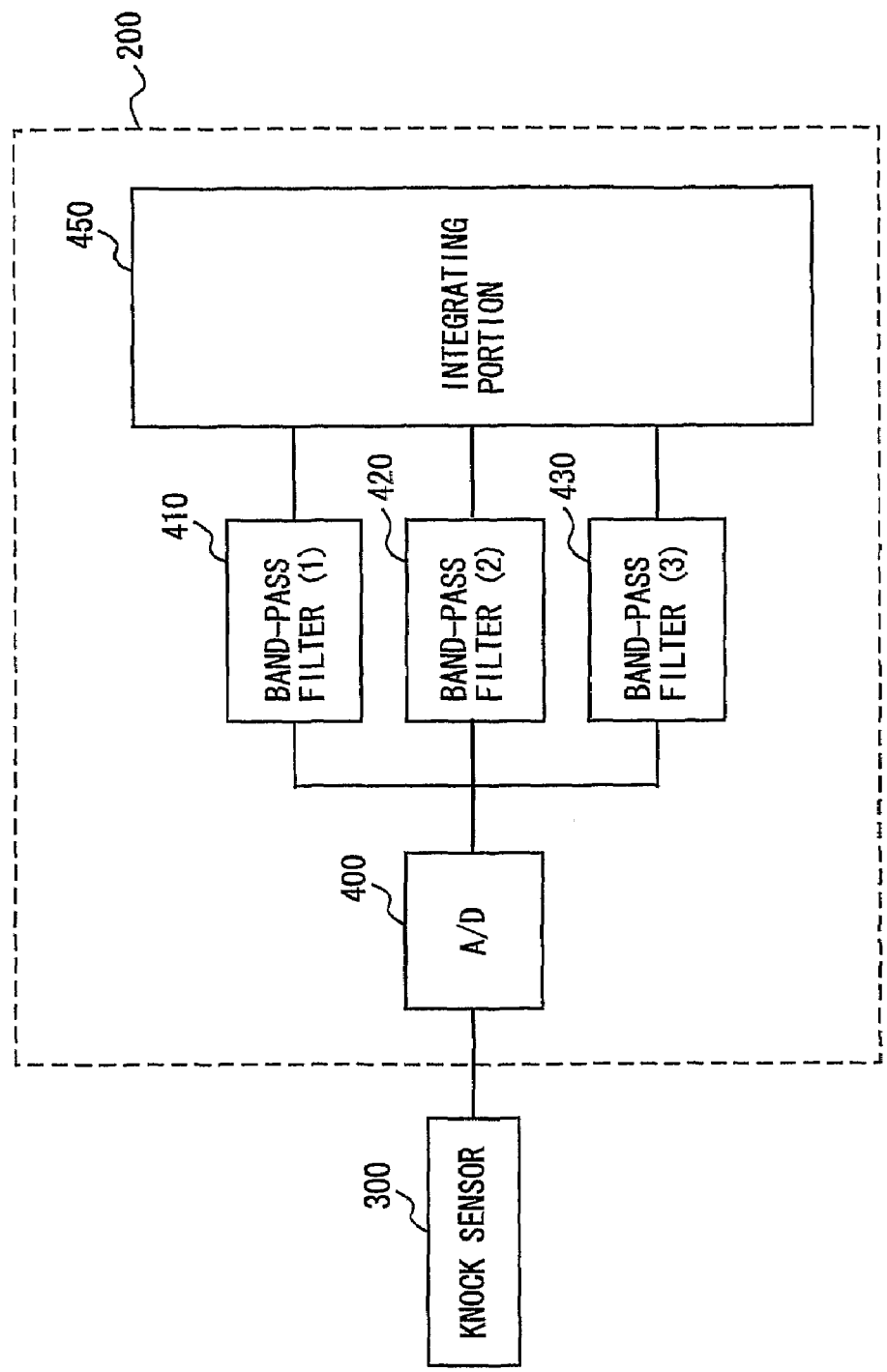
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
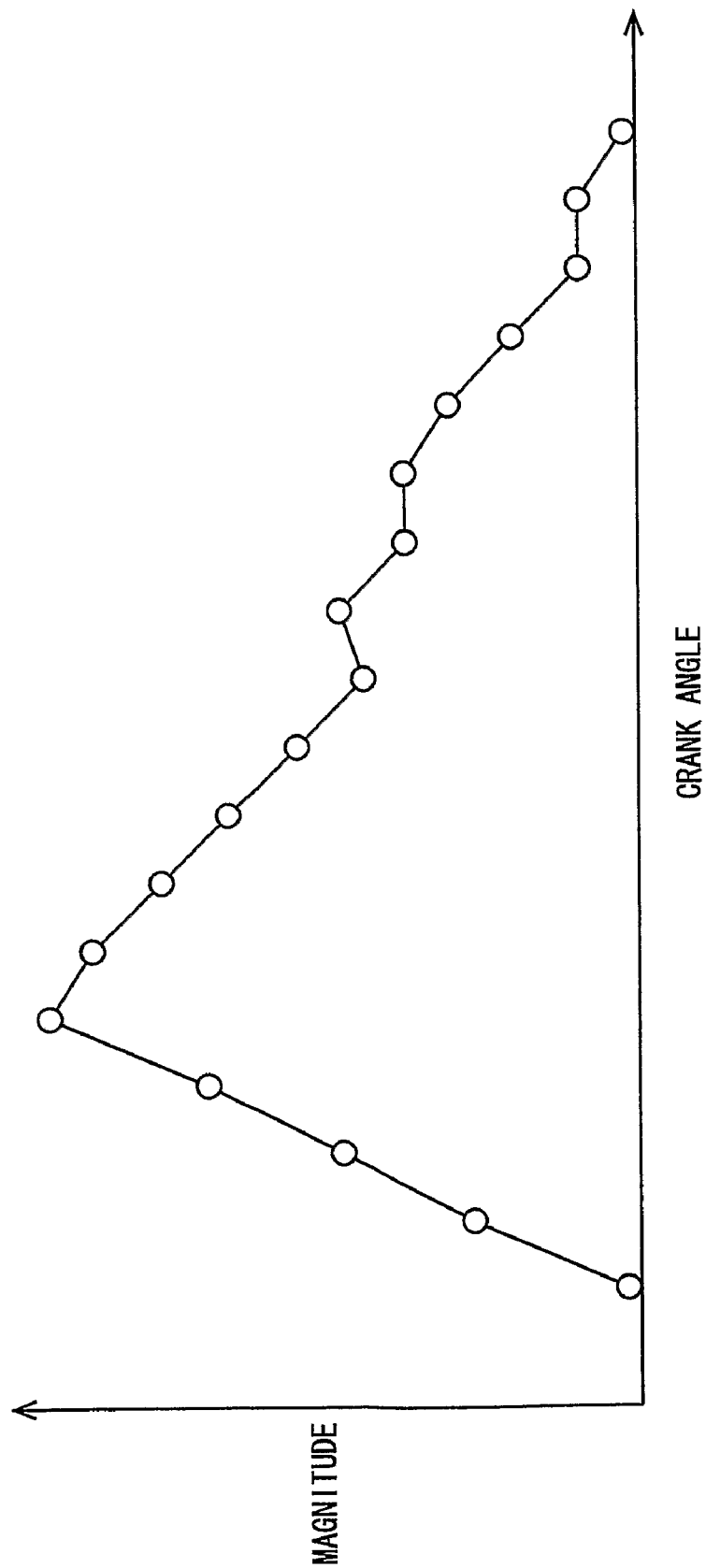
FIG. 4 is a chart showing a waveform of vibration in the engine.

As a result, as shown in FIG. 4, a vibration waveform of engine 100 is detected. In other words, the synthesized waveform of the first to third frequency bands A to C are used as the vibration waveform of engine 100.

Figure 5:
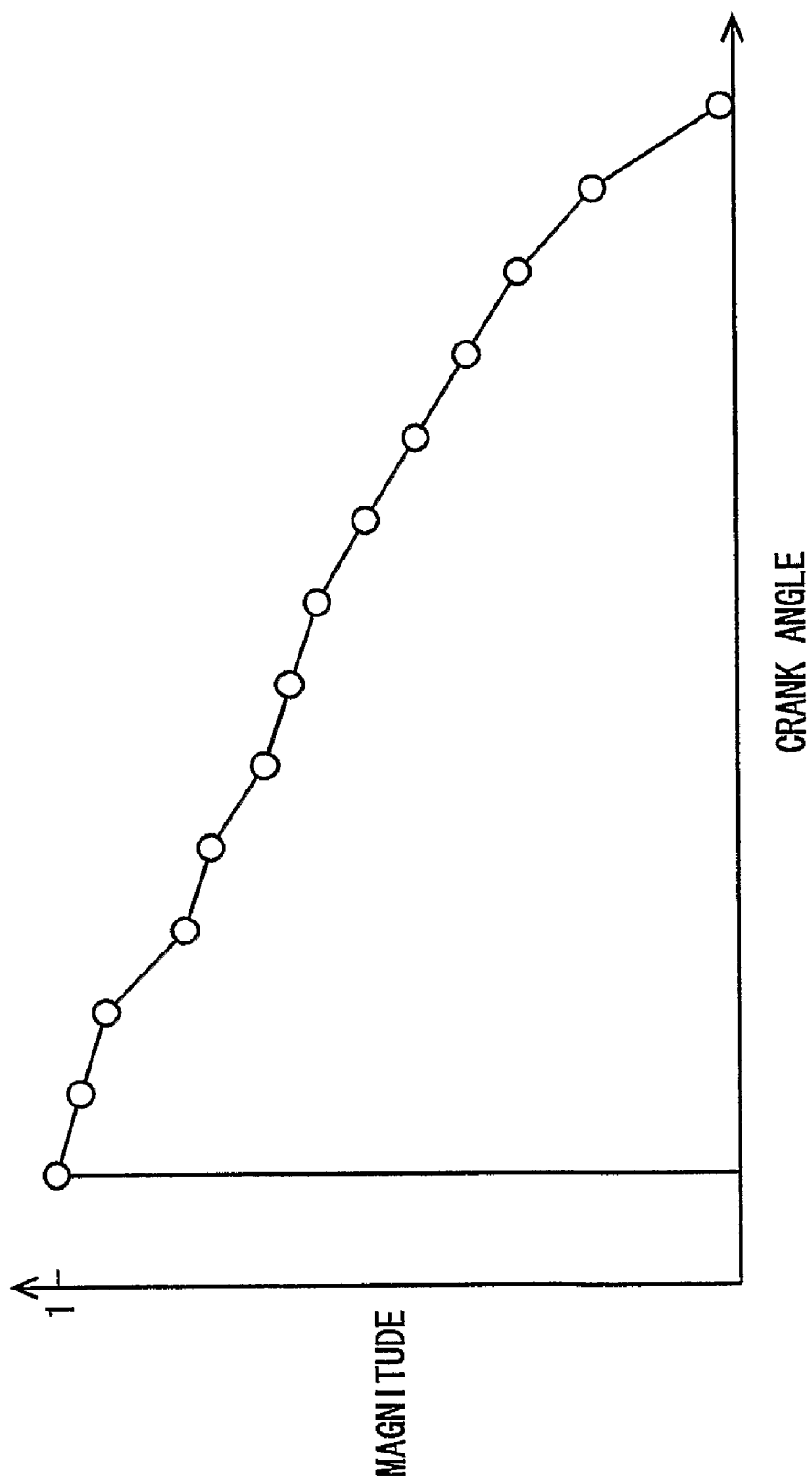
FIG. 5 is a chart showing a knock waveform model stored in memory of the engine ECU.

The detected vibration waveform is compared with a knock waveform model stored in memory 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
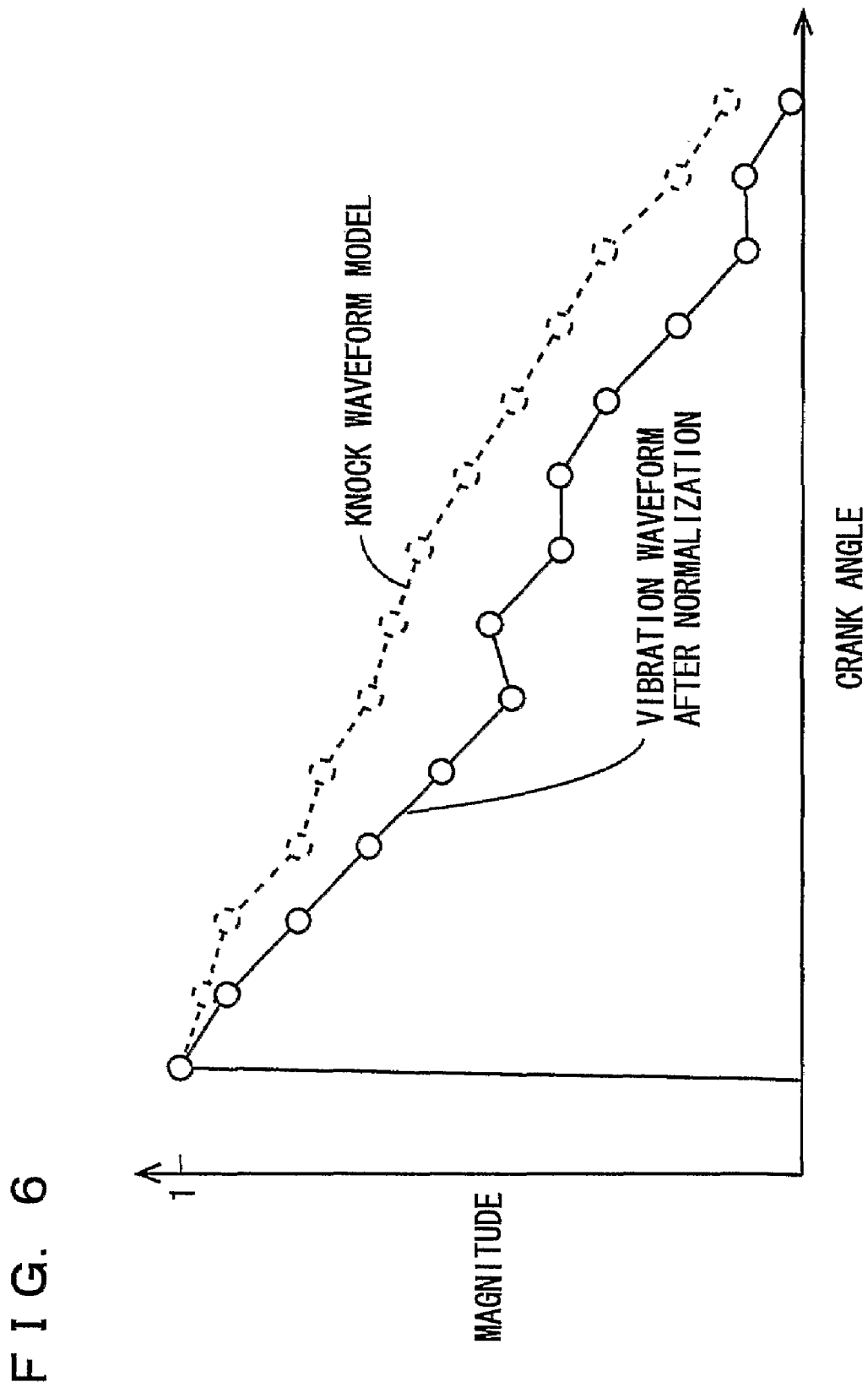
FIG. 6 is a chart for comparing the vibration waveform with the knock waveform model.
Figure 8:
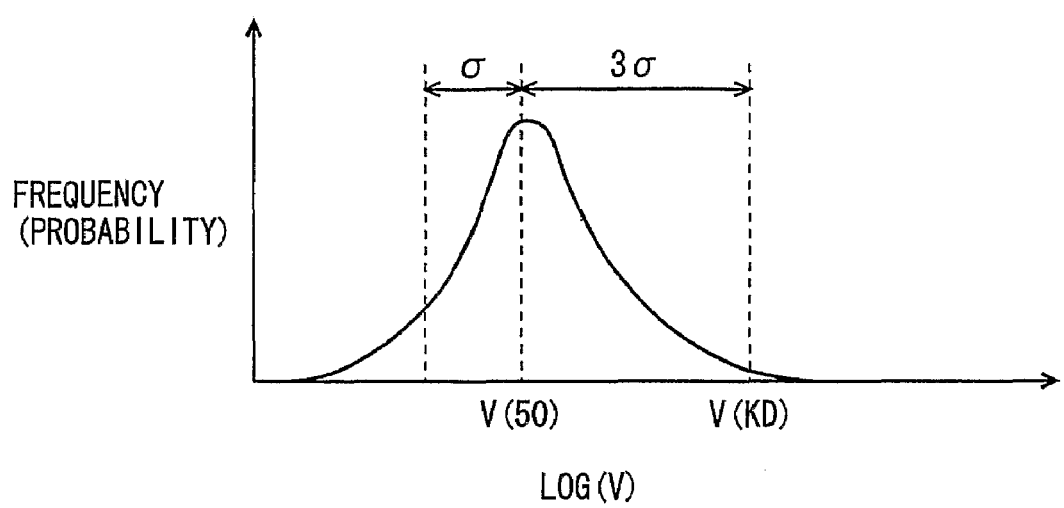
FIG. 8 is a chart (No. 1) showing frequency distribution of magnitude values LOG(V)

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If the maximum integrated value is P and a value representing the magnitude of vibration of engine 100 where knocking does not occur is BGL (Back Ground Level), knock magnitude N is calculated by an equation, N=P/BGL. BGL is stored in memory 202. A method of calculating knock magnitude N is not limited to it.

In the embodiment, engine ECU 200 compares calculated knock magnitude N and a determination value V(KX) stored in memory 202 with each other, and further compares the detected waveform and the stored knock waveform model with each other. Then engine ECU 200 determines whether or not knocking has occurred in engine 100 for every ignition cycle.

As shown in FIG. 7, determination values V(KX) are stored as a map using an engine speed NE and an intake air amount KL as parameters.

As an initial value of determination value V(KX), a value determined in advance by an experiment or the like is used. However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a determination value V(KX) is corrected using frequency distribution representing a relationship between a magnitude value LOG(V) which is a value obtained by logarithmically converting magnitude V and a frequency (the number of times, a probability) of detection of each magnitude value LOG(V).

Corresponding determination value V(KX) is corrected based on frequency distribution of magnitude values LOG(V) for each range in which engine speed NE and intake air amount KL are used as parameters. Magnitude V used for calculating magnitude value LOG(V) is a peak value (peak value of integrated values at every 5°) of magnitudes between predetermined crank angles.

In the frequency distribution, median value V(50), at which the accumulative sum of frequencies of magnitudes LOG(V) from the minimum value reaches 50%, and a standard deviation σ of magnitude values LOG(V) equal to or smaller than median value V(50) are calculated. For example, in the embodiment, a median value V(50) and a standard deviation σ, which approximate the median value and standard deviation calculated based on a plurality of magnitude values LOG (V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

A value obtained by adding the product of a coefficient U(1) (U(1) is a constant and U(1)=3, for example) and standard deviation σ to median value V(50) is a knock determination level V(KD). A method of calculating knock determination level V(KD) is not limited to it. Frequency of magnitude values LOG(V) greater than knock determination level V(KD) is determined as a frequency of occurrence of knocking.

Coefficient U(1) is a coefficient obtained based on data and findings obtained by experiments and the like, Magnitude value LOG(V) greater than knock determination level V(KD) when U(1)=3 substantially agrees with magnitude value LOG (V) in an ignition cycle in which knocking has actually occurred. It is also possible to use other values than "3" as coefficient U(1).

Figure 9:
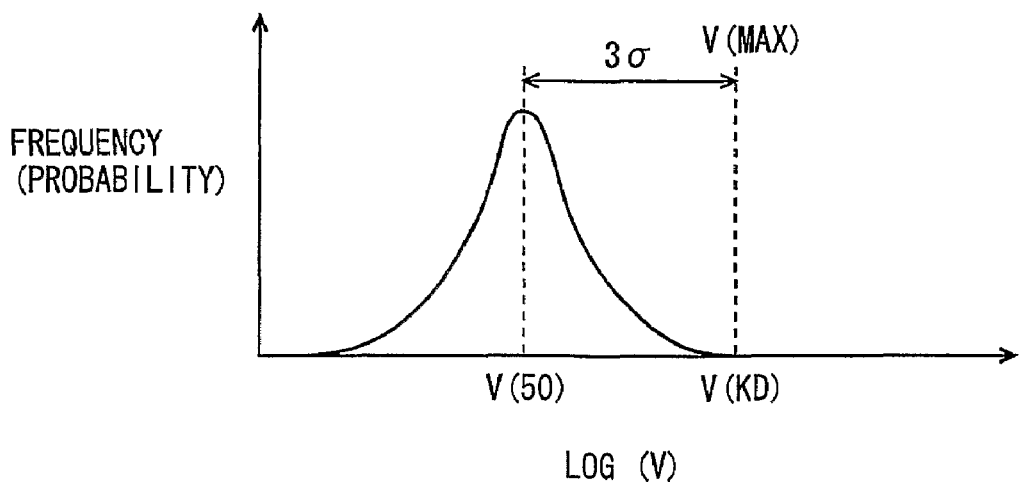
FIG. 9 is a chart (No. 2) showing frequency distribution of magnitude values LOG(V)
Figure 10:
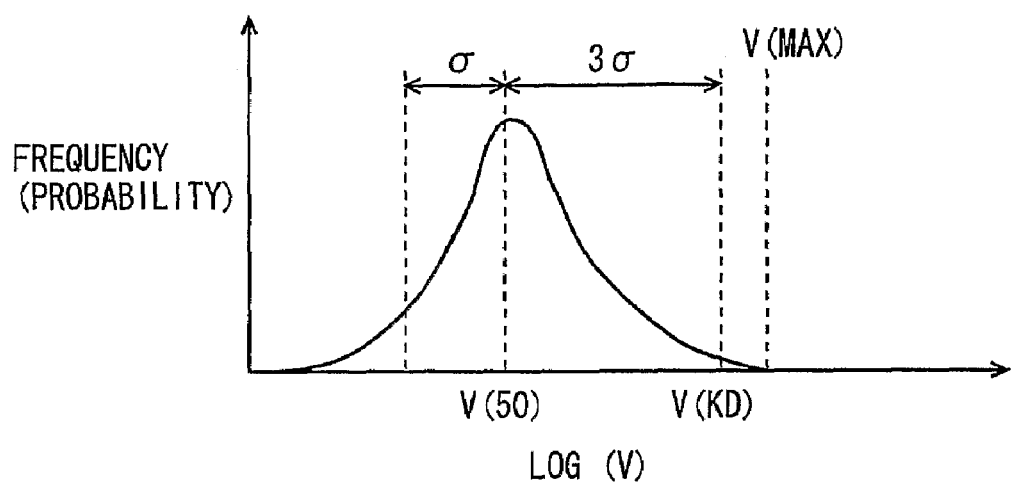
FIG. 10 is a chart (No. 3) showing frequency distribution of magnitude values LOG(V)

If knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, when a greater magnitude V is detected and a great magnitude value LOG(V) is calculated due to occurrence of knocking, as shown in FIG. 10, maximum value V(MAX) becomes greater than knock determination level V(KD).

Figure 11:
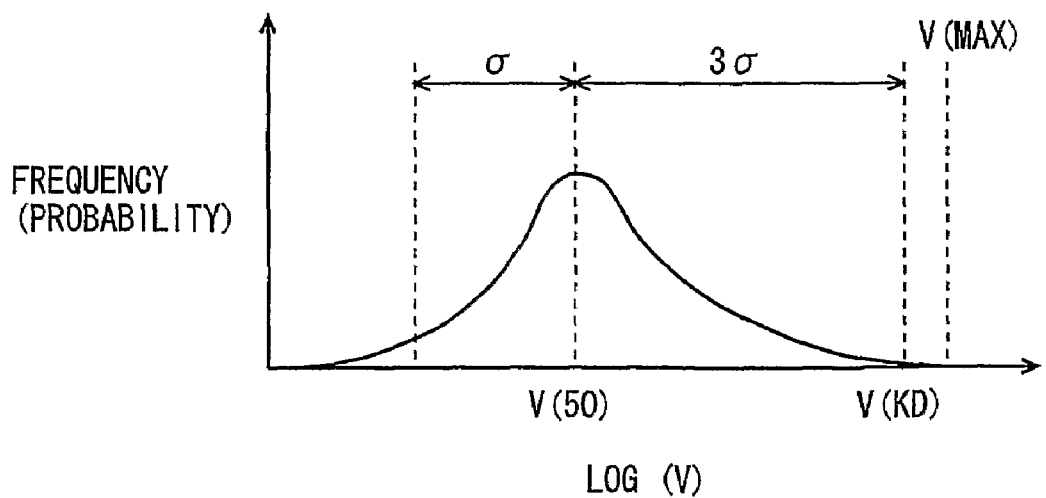
FIG. 11 is a chart (No. 4) showing frequency distribution of magnitude values LOG(V)

When the frequency of occurrence of knocking becomes further higher or the mechanical vibration of engine 100 itself becomes greater, as shown in FIG. 11, maximum value V(MAX) becomes further greater. Median value V(50) and standard deviation σ in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Figure 12:
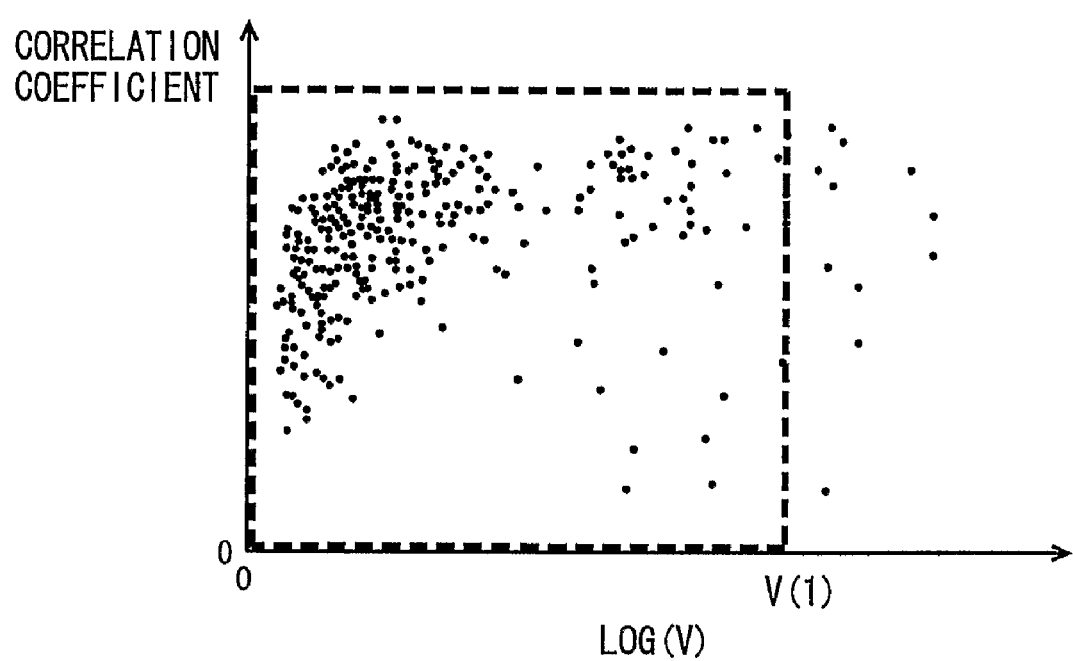
FIG. 12 is a chart showing magnitude values LOG(V) used for forming the frequency distribution of the magnitude values LOG(V)

Therefore, in the embodiment, magnitude values LOG(V) in a range surrounded with a broken line in FIG. 12 are used to calculate median value V(50) and standard deviation σ, excluding magnitude values LOG(V) greater than a threshold value V(1). FIG. 12 is a chart in which calculated magnitude values LOG(V) are plotted for each correlation coefficient K in a cycle in which the magnitude values LOG(V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation σ, median value V(50) and standard deviation σ do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation σ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
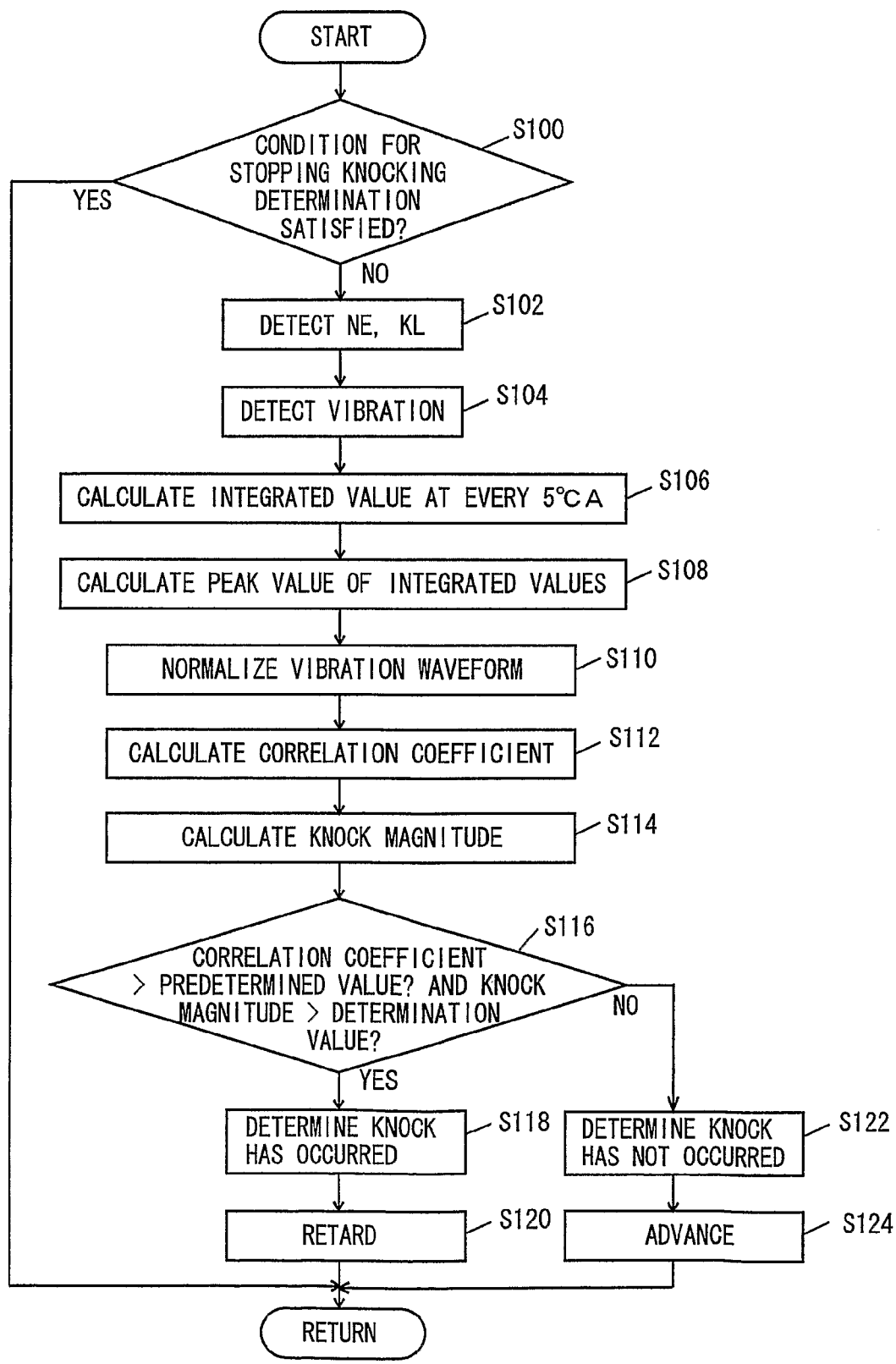
FIG. 13 is a flowchart (No. 1) showing a control structure of the program executed by the engine ECU in FIG. 1.

With reference to FIG. 13, a control structure of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 determines whether or not a condition for stopping knocking determination is satisfied. For example, when engine 100 is in an idling state, it is determined that a condition for stopping knocking determination is satisfied. When a condition for stopping knocking determination is satisfied (YES in S100), the processing ends. Otherwise (NO in S100), the processing moves to S102.

In S102, engine ECU 200 detects engine speed NE based on a signal sent from crank position sensor 306 and detects intake air amount KL based on a signal sent from air flow meter 314.

In S104, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S106, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S108, engine ECU 200 calculates the largest integrated value (peak value) out of integrated values in a synthesized waveform (vibration waveform of engine 100) of the first to third frequency bands A to C.

In S110, engine ECU 200 normalizes the vibration waveform of engine 100. Here, normalization means to express the magnitude of the vibration as a dimensionless number in a range of 0 to 1 by dividing each integrated value by the calculated peak value.

In S112, engine ECU 200 calculates correlation coefficient K which is a value related to the deviation of the corrected vibration waveform and the knock waveform model from each other.

In S114, engine ECU 200 calculates knock magnitude N. In S116, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S116), the processing moves to S118. Otherwise (NO in S116), the processing moves to S122.

In S118, engine ECU 200 determines that knocking has occurred in engine 100. In S120, engine ECU 200 retards the ignition timing. In S122, engine ECU 200 determines that knocking has not occurred in engine 100. In S124, engine ECU 200 advances the ignition timing.

It is noted that a condition for stopping knocking determination is not limited to the condition described in S100. For example, in at least one of the following situation, i.e., when engine 100 is in a predetermined operation state (such as when engine 100 operates in a range where the load of engine 100 is higher than a predetermined load), when the temperature of cooling water detected by water temperature sensor 302 is lower than a predetermined temperature, when the voltage of power supply of engine ECU 200 is lower than a predetermined voltage, and when knock sensor 300 is damaged, it may be determined that a condition for stopping knocking determination is satisfied.

Figure 14:
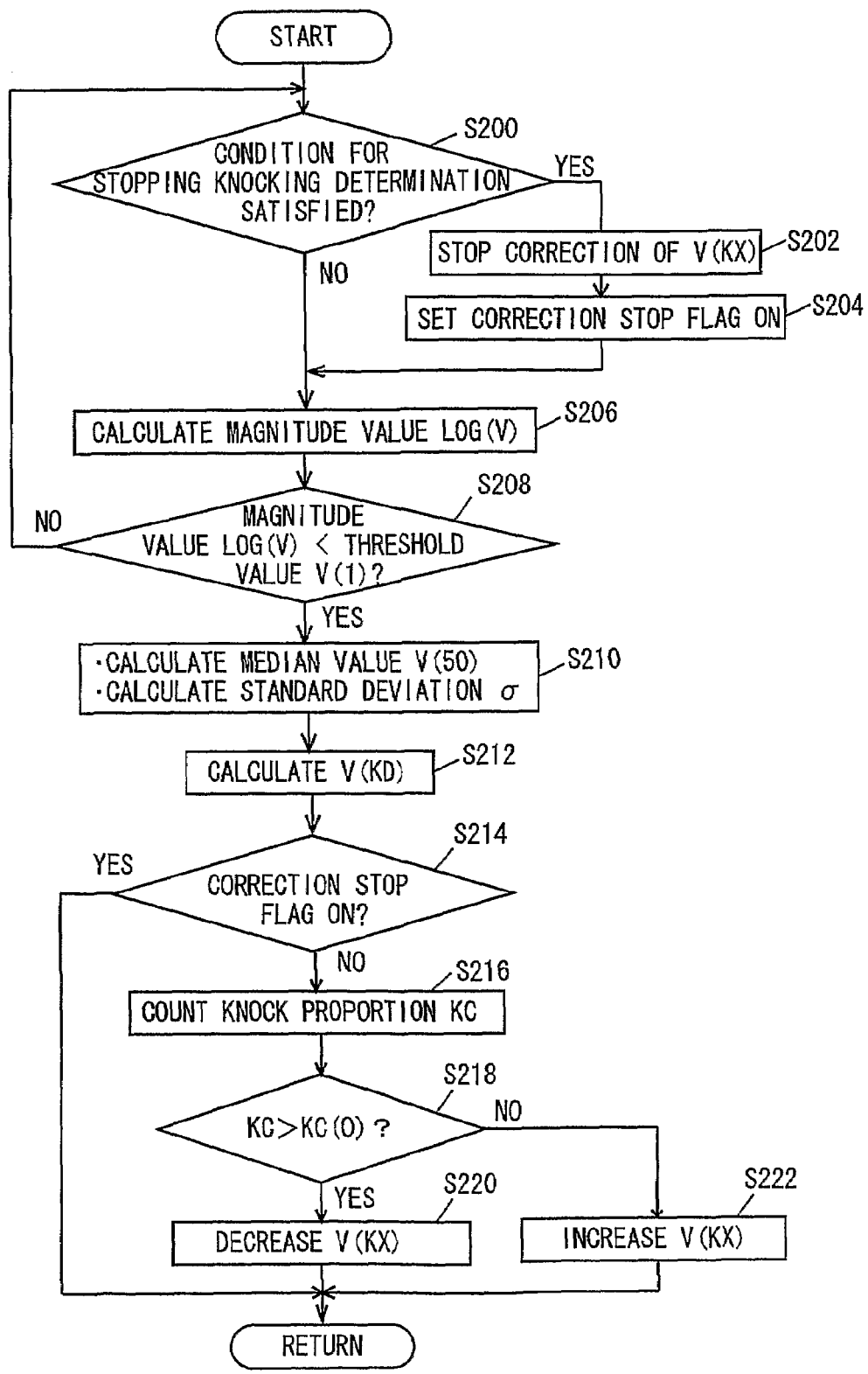
FIG. 14 is a flowchart (No. 2) showing the control structure of the program executed by the engine ECU in FIG. 1.

With reference to FIG. 14, a control structure of a program executed by engine ECU 200 which is the ignition timing control device according to the embodiment so as to correct determination value V(KX) will be described.

In S200, engine ECU 200 determines whether or not a condition for stopping knocking determination is satisfied. For example, when engine 100 is in an idling state, it is determined that a condition for stopping knocking determination is satisfied. When a condition for stopping knocking determination is satisfied (YES in S200), the processing moves to S202. Otherwise (NO in S200), the processing moves to S206.

In S202, engine ECU 200 stops correction of determination value V(KX). In S204, engine ECU 200 sets a correction stop flag to "ON". The correction stop flag is automatically set to "OFF" when a condition for stopping knocking determination is not satisfied (NO in S200).

In S206, engine ECU 200 calculates magnitude value LOG (V) from magnitude V detected based on a signal sent from knock sensor 300. Magnitude V is a peak value (peak value of integrated values at every 5°) between predetermined crank angles.

In S208, engine ECU 200 determines whether magnitude value LOG(V) is smaller than the aforementioned threshold value V(1). When magnitude value LOG(V) is smaller than the aforementioned threshold value V(1) (YES in S208), the processing moves to S210. Otherwise (NO in S208), the processing goes back to S200.

In S210, engine ECU 200 calculates median value V(50) and standard deviation a of the extracted magnitude value LOG(V). In S212, engine ECU 200 calculates knock determination level V(KD) based on median value V(50) and standard deviation σ.

In S214, engine ECU 200 determines whether or not the correction stop flag is "ON". When the correction stop flag is "ON" (YES in S214), the processing ends. Otherwise (NO in S214), the processing moves to S216.

In S216, engine ECU 200 counts the proportion of magnitude values LOG(V) greater than knock determination level V(KD) to the calculated magnitude values LOG(V) as a knock proportion KC.

In S218, engine ECU 200 determines whether or not knock proportion KC is greater than a threshold value KC(0). If knock proportion KC is greater than threshold value KC(0) (YES in S218), the processing moves to S220. Otherwise (NO in S218), the processing moves to S222.

In S220, engine ECU 200 decreases determination value V X). In S222, engine ECU 200 increases determination value V(KX).

It is noted that a condition for stopping knocking determination is not limited to the condition described in S200. For example, in at least one of the following situation, i.e., when engine 100 is in a predetermined operation state (such as when engine 100 operates in a range where the load of engine 100 is higher than a predetermined load), when the temperature of cooling water detected by water temperature sensor 302 is lower than a predetermined temperature, when the voltage of power supply of engine ECU 200 is lower than a predetermined voltage, and when knock sensor 300 damaged, it may be determined that a condition for stopping knocking determination is satisfied.

Operation of engine ECU 200 which is the ignition timing control device according to the embodiment based on the above configuration and flowcharts will be described.

During an operation of engine 100, when a condition for stopping knocking determination is not satisfied (NO in S100), engine speed NE is detected based on the signal sent from crank position sensor 306 and intake air amount KL is detected based on the signal sent from air flow meter 314 (S102). Moreover, based on the signal sent from knock sensor 300, a magnitude of vibration of engine 100 is detected (S104). Between the top dead center and 90° in the combustion stroke, the integrated value for every 5° of vibrations in each of the first to third frequency bands A to C is calculated (S106). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to detect a vibration waveform of which delicate variations are suppressed. Therefore, it becomes easy to compare the detected vibration waveform and the knock waveform model with each other. Based on the calculated integrated values, peak value P of the integrated values in the synthesized waveform (vibration waveform of engine 100) of the first to third frequency bands A to C is calculated (S108).

The integrated value in the vibration waveform of engine 100 is divided by the calculated peak value P to thereby normalize the vibration waveform (S110). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value ΔS(I) of the deviation of the vibration waveform after the normalization and the knock waveform model from each other at each crank angle is calculated. Based on the total of ΔS(I), i.e., ΣΔS(I) and value S obtained by integrating the magnitude of the vibration in the knock waveform model by the crank angle, correlation coefficient K is calculated by K=(S−ΣΔS(I))/S (S112). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Knock magnitude N is calculated by dividing peak value P by BGL (S114). Thus, it becomes possible to analyze in more detail whether or not vibration of engine 100 is due to knocking, based on magnitude of vibration.

If correlation coefficient K is greater than a predetermined value and knock magnitude N is greater than determination value V(KX) (YES in S116), it is determined that knocking has occurred (S118) and the ignition timing is retarded (S120). As a result, occurrence of knocking is suppressed. If correlation coefficient K is not greater than a predetermined value or knock magnitude N is not greater than determination value V (KX) (NO in S116), it is determined that knocking has not occurred (S122) and the ignition timing is advanced (S124).

Thus, by comparing knock magnitude N and determination value V(KX) with each other, whether or not knocking has occurred is determined for each ignition cycle, and ignition timing is retarded or advanced.

Meanwhile, as described above, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in engine ECU 200 that is the ignition timing control device of the present embodiment, when a condition for stopping knocking determination is not satisfied (NO in S200), magnitude value LOG(V) is calculated (S206). When calculated magnitude value LOG(V) is smaller than the aforementioned threshold value V(1) (YES in S208), median value V(50) and standard deviation σ are calculated (S210). Thus, by extracting only magnitude values LOG(V) smaller than threshold value V(1) to calculate median value V(50) and standard deviation σ, median value V(50) and standard deviation σ do not become excessively great, and become stable values. Based on such median value V(50) and standard deviation σ, knock determination level V(KD) is calculated (S212). As a result, knock determination level V(KD) can be suppressed from becoming excessively high. When the correction stop flag is not "ON" (NO in S214), knock proportion KC (the frequency of occurrence of knocking) is counted (S216). When knock proportion KC is greater than threshold value KC(0) (YES in S218), determination value V(KX) is decreased (S220). When knock proportion KC is smaller than threshold value KC(0) (NO in S218), determination value V(KX) is increased (S222). Accordingly, it becomes possible to set the determination value in the knocking determination for each ignition cycle to an appropriate value, to thereby attain appropriate ignition timing.

Meanwhile, for example when the state of the internal combustion engine is an idling state, knocking hardly occurs. Therefore, it is not necessary to determine whether knocking is present or absent to control ignition timing. Accordingly, when a condition for stopping knocking determination is satisfied (for example in an idling state) (YES in S100), the knocking determination is not made. Further, correction of determination value V(KX) is stopped (S202). That is, knock proportion KC (the frequency of occurrence of knocking) is not counted, Still further, determination value (KX) is not decreased (S220) or increased (S222) based on a result of comparison between knock proportion KC and threshold value KC(0).

Figure 15:
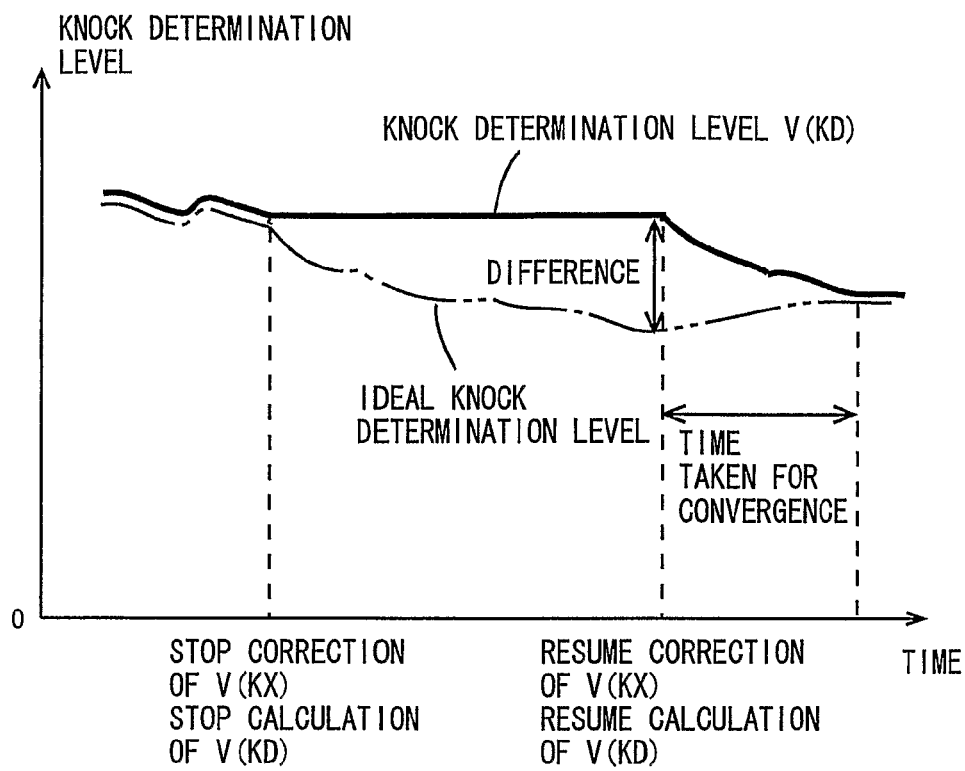
FIG. 15 is a timing chart (No. 1) of knock determination level V(KD)

Here, as shown in FIG. 15, when calculation of knock determination level V(KD) is stopped in a state where correction of determination value V(KX) is stopped, in resuming the correction of determination value V(KX), knock proportion KC is counted based on knock determination level V(KD) immediately before correction is stopped. Correction of determination value V(KX) is performed based on this knock proportion KC. Knock determination level V(KD) immediately before correction is stopped does not reflect the effect of the change in the operation state of the engine in the period where correction of determination value V(KX) has been stopped. Therefore, there may be a difference between knock determination level V(KD) immediately before correction is stopped and the ideal knock determination level, and knock determination level V(KD) immediately before correction is stopped may not be an appropriate value after the correction is resumed. Accordingly, until knock determination level V(KD) converges to an appropriate value near the ideal knock determination level, determination value V(KX) may not be corrected appropriately.

Therefore, in engine ECU 200 that is the ignition timing control device of the embodiment, even after a condition for stopping knocking determination is satisfied (YES in S200) and correction of determination value V(KX) is stopped (S202) and correction stop flag is set to "ON" (S204), magnitude value LOG(V) is calculated (S206) similarly to the case where a condition for stopping knocking determination is not satisfied (NO in S200). When the calculated magnitude value LOG(V) is smaller than threshold value V(1) (YES in S208), median value V(50) and standard deviation σ are calculated (S210). Knock determination level V(KD) is calculated based on median value V(50) and standard deviation σ (S212).

Figure 16:
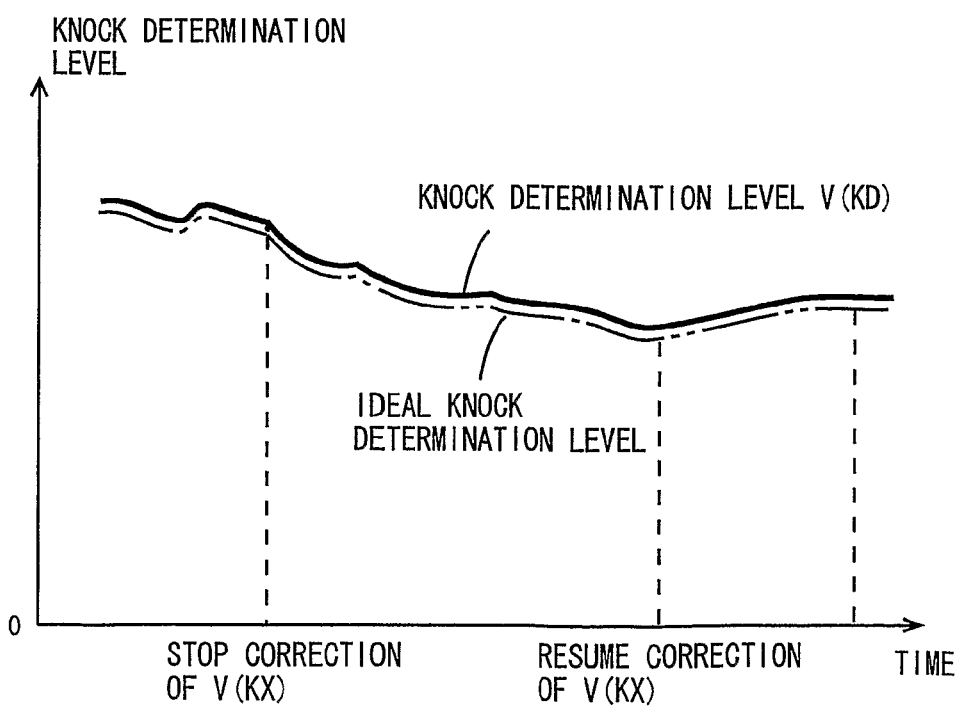
FIG. 16 is a timing chart (No. 2) of knock determination level V(KD)

That is, as shown in FIG. 16, calculation of knock determination level V(KD) is continued in a state where correction of determination value V(KX) is stopped. This allows knock determination level V(KD) to be an appropriate value which is substantially the same level as the ideal knock determination level. Thus, from the time point immediately after correction of determination value V(KX) is resumed, determination value V(KX) is appropriately corrected based on the appropriate knock determination level V(KD). This allows the determination value in the knocking determination for each ignition cycle to be an appropriate value at an early stage, to thereby attain appropriate ignition timing.

As above, according to the engine ECU that is the ignition timing control device of the embodiment, when a condition for stopping knocking determination is not satisfied, median value V(50) and standard deviation σ are calculated based on magnitude value LOG(V). Based on median value V(50) and standard deviation σ, knock determination level V(KD) is calculated. Based on knock determination level V(KD), knock proportion KC (the frequency of occurrence of knocking) is counted. Based on a result of comparison between knock proportion KC and threshold value KC(0), determination value V(KX) is corrected. This allows the determination value in the knocking determination for each ignition cycle to be an appropriate value, to thereby attain appropriate ignition timing.

Figure 17:
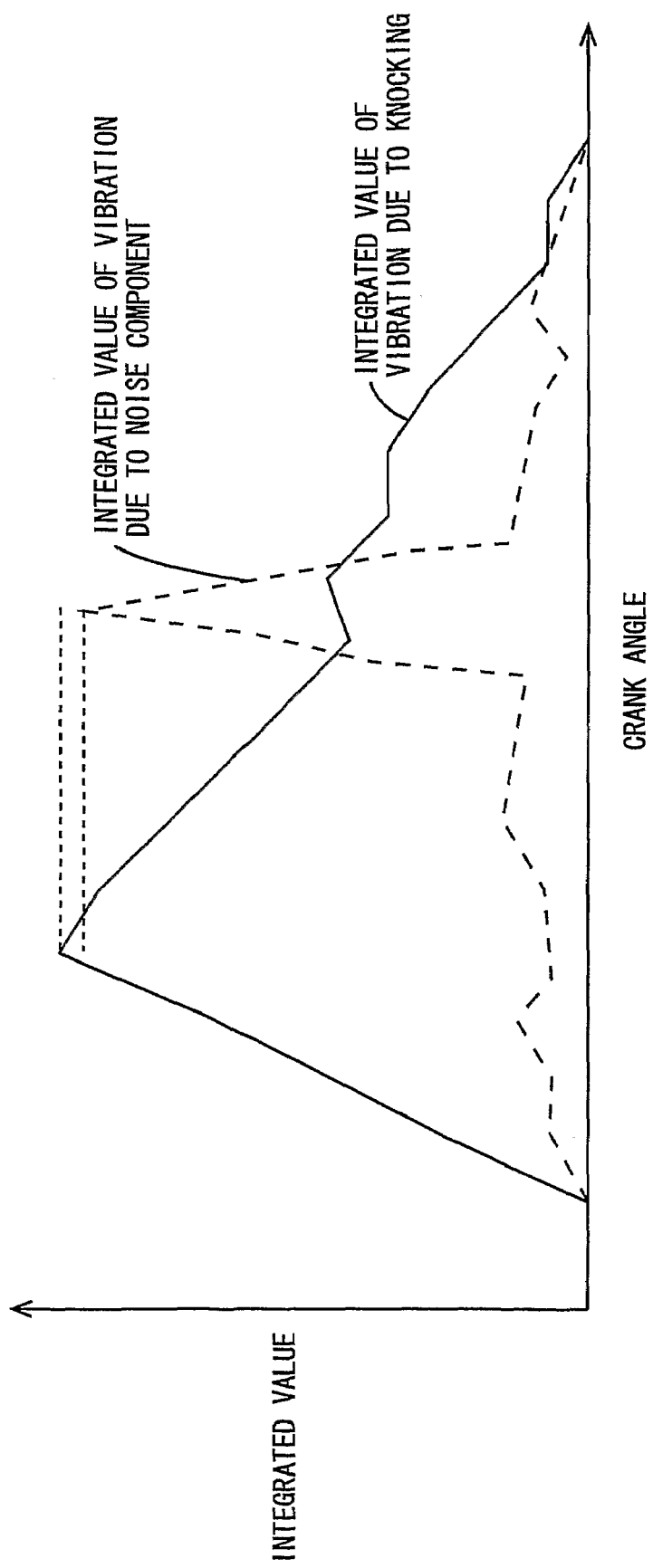
FIG. 17 is a chart (No. 1) showing an integrated value at the time of knocking and an integrated value by noise.
Figure 18:
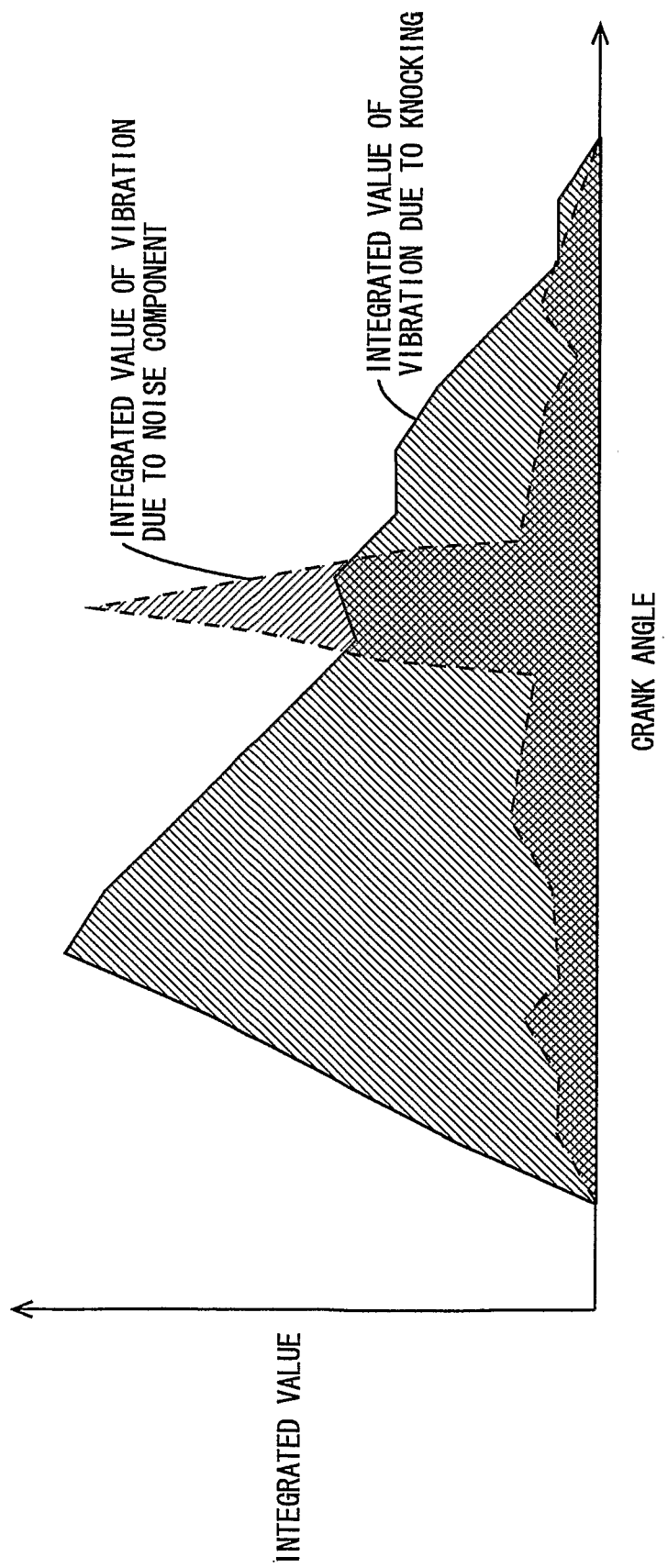
FIG. 18 is a chart (No. 2) showing an integrated value at the time of knocking and an integrated value by noise.

As shown in FIG. 17, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 18, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the sum of the integrated values in the vibration waveform by BGL.

As shown in FIG. 18, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A device for controlling ignition timing of an internal combustion engine, comprising:
   means for calculating knock magnitude related to magnitude of vibration due to knocking, based on magnitude of vibration occurring in said internal combustion engine;
   means for controlling ignition timing of said internal combustion engine, based on a result of comparison between said knock magnitude and a predetermined determination value;
   detecting means for detecting a magnitude value related to the magnitude of vibration occurring in said internal combustion engine;
   operation means for performing an operation used for determining a knocking occurrence state, based on said magnitude value,
   determining means for determining the knocking occurrence state, based on a result of said operation by said operating means,
   correcting means for correcting said determination value, based on a result of said determination by said determining means; and
   stopping means for, when a predetermined condition is satisfied, stopping correction of said determination value, wherein
   said operating means includes means for continuously performing said operation, in a state where correction of said determination value is stopped by said stopping means.

2. The device for controlling ignition timing of the internal combustion engine according to claim 1, wherein
   said operation is an operation of calculating a knock determination level, based on said magnitude value, and
   said determining means includes means for determining the knocking occurrence state, based on a result of comparison between said magnitude value and said knock determination level.

3. The device for controlling ignition timing of the internal combustion engine according to claim 2, wherein
   said knock determination level is calculated by adding a product of a standard deviation of said magnitude values and a predetermined coefficient to a median value of said magnitude values.

4. The device for controlling ignition timing of the internal combustion engine according to claim 1, wherein
   said predetermined condition is at least one of a condition that said internal combustion engine is in a predetermined operation state, a condition that a voltage of power supply of said device for controlling ignition timing is lower than a predetermined voltage, and a condition that said detecting means is in an abnormal state.

5. The device for controlling ignition timing of the internal combustion engine according to claim 4, wherein
   said predetermined operation state is at least one of an idling state and a state where a temperature of cooling water of said internal combustion engine is lower than a predetermined temperature.

6. The device for controlling ignition timing of the internal combustion engine according to claim 1, wherein
   said determining means includes means for determining a knocking occurrence frequency, and said correcting means includes means for correcting said determination value, based on said knocking occurrence frequency.

7. A device for controlling ignition timing of an internal combustion engine, comprising:
a knock sensor detecting a magnitude value related to magnitude of vibration occurring in said internal combustion engine; and
an operation unit connected to said knock sensor, wherein
said operation unit calculates knock magnitude related to magnitude of vibration due to knocking, based on the magnitude of vibration occurring in said internal combustion engine,
said operation unit controls ignition timing of said internal combustion engine, based on a result of comparison between said knock magnitude and a predetermined determination value,
said operation unit performs an operation used for determining a knocking occurrence state, based on said magnitude value,
said operation unit determines the knocking occurrence state, based on a result of said operation,
said operation unit corrects said determination value, based on the knocking occurrence state,
when a predetermined condition is satisfied, said operation unit stops correction of said determination value, and
said operation unit continuously performs said operation, in a state where correction of said determination value is stopped.

8. The device for controlling ignition timing of the internal combustion engine according to claim 7, wherein
said operation is an operation of calculating a knock determination level, based on said magnitude value, and
said operation unit determines the knocking occurrence state, based on a result of comparison between said magnitude value and said knock determination level.

9. The device for controlling ignition timing of the internal combustion engine according to claim 8, wherein
said knock determination level is calculated by adding a product of a standard deviation of said magnitude values and a predetermined coefficient to a median value of said magnitude values.

10. The device for controlling ignition timing of the internal combustion engine according to claim 7, wherein
said predetermined condition is at least one of a condition that said internal combustion engine is in a predetermined operation state, a condition that a voltage of power supply of said device for controlling ignition timing is lower than a predetermined voltage, and a condition that said knock sensor is in an abnormal state.

11. The device for controlling ignition timing of the internal combustion engine according to claim 10, wherein
said predetermined operation state is at least one of an idling state and a state where a temperature of cooling water of said internal combustion engine is lower than a predetermined temperature.

12. The device for controlling ignition timing of the internal combustion engine according to claim 7, wherein
said operation unit determines a knocking occurrence frequency, and
said operation unit corrects said determination value, based on said knocking occurrence frequency.

13. A method of controlling ignition timing of an internal combustion engine, comprising:
calculating knock magnitude related to magnitude of vibration due to knocking, based on magnitude of vibration occurring in said internal combustion engine;
controlling ignition timing of said internal combustion engine, based on a result of comparison between said knock magnitude and a predetermined determination value;
detecting a magnitude value related to the magnitude of vibration occurring in said internal combustion engine;
performing an operation used for determining a knocking occurrence state, based on said magnitude value;
determining the knocking occurrence state, based on a result of said operation;
correcting said determination value, based on the knocking occurrence state; and
when a predetermined condition is satisfied, stopping correction of said determination value, wherein
said performing the operation includes continuously performing said operation, in a state where correction of said determination value is stopped.

14. The method of controlling ignition timing of the internal combustion engine according to claim 13, wherein
said operation is an operation of calculating a knock determination level, based on said magnitude value, and
said determining the knocking occurrence state includes determining the knocking occurrence state, based on a result of comparison between said magnitude value and said knock determination level.

15. The method of controlling ignition timing of the internal combustion engine according to claim 14, wherein
said knock determination level is calculated by adding a product of a standard deviation of said magnitude values and a predetermined coefficient to a median value of said magnitude values.

16. The method of controlling ignition timing of the internal combustion engine according to claim 13, wherein
said predetermined condition is at least one of a condition that said internal combustion engine is in a predetermined operation state, a condition that a voltage of power supply is lower than a predetermined voltage, and a condition that a knock sensor is in an abnormal state.

17. The method of controlling ignition timing of the internal combustion engine according to claim 16, wherein
said predetermined operation state is at least one of an idling state and a state where a temperature of cooling water of said internal combustion engine is lower than a predetermined temperature.

18. The method of controlling ignition timing of the internal combustion engine according to claim 13, wherein
said determining the knocking occurrence state includes determining a knocking occurrence frequency, and
said correcting said determination value includes correcting said determination value, based on said knocking occurrence frequency.

* * * * *